(No Model.)

G. B. GANO.
CAR COUPLING.

No. 294,987. Patented Mar. 11, 1884.

Attest;
T. Walter Fowler,
W. Cruickshank

Inventor;
Garrett B. Gano
by R. K. Evans
his atty.

UNITED STATES PATENT OFFICE.

GARRETT B. GANO, OF EASTON, MARYLAND.

CAR-COUPLING.

SPECIFICATION forming part of Letters Patent No. 294,987, dated March 11, 1884.

Application filed January 15, 1884. (No model.)

*To all whom it may concern:*

Be it known that I, GARRETT B. GANO, of Easton, in the county of Talbot and State of Maryland, have invented certain Improvements in Car-Couplers; and I hereby declare the following to be a full, clear, and exact description, reference being had to the accompanying drawings, making part of this specification, in which—

Figure 1:
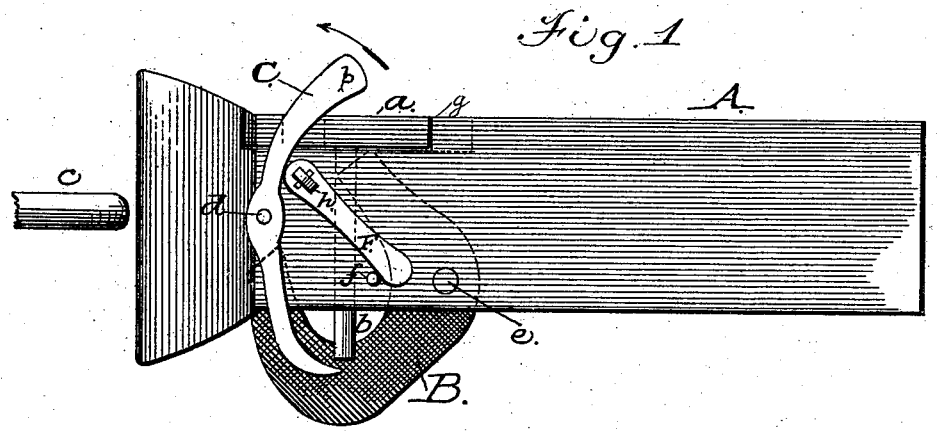
Figure 2:
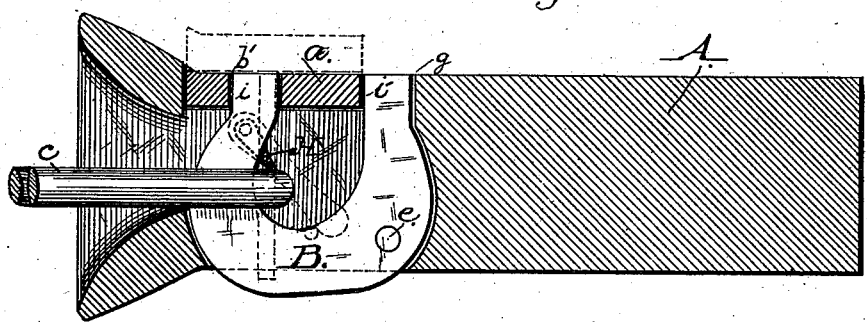
Figures 3, 4:
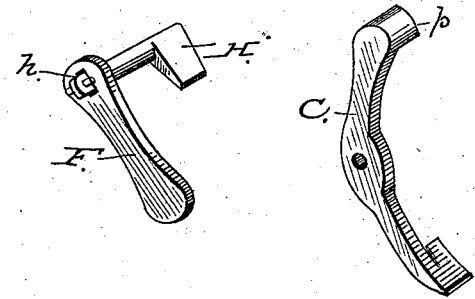

Figure 1 is a side elevation of my improved coupling. Fig. 2 is a longitudinal vertical section through the same. Figs. 3 and 4 are details to be referred to.

My invention relates to car-couplings which engage automatically; and it consists in certain details of construction and operation, as hereinafter fully described, and specifically pointed out in the claims.

In order that those skilled in the art may make and use my invention, I will proceed to describe the manner in which I have carried it out.

In the said drawings, A is the draw-head, preferably divided longitudinally on a vertical central line, the two sections being fastened together in any convenient manner. The draw-head has the usual flaring opening, into which the link passes. Within the hollow end of the draw-head and on each side is pivoted a drop or weighted lever, H, having a shank, which passes through the wall of the draw-head, and engages at $h$ with a weighted handle, F. When the link passes into the draw-head, it presses up the levers H H, which rest upon the end of the link when it has passed into the draw-head and prevent it from dropping. The link $c$ is secured or caught automatically in the draw-head by means of a curved dog or pin, B, which is secured and pivoted in the draw-head by the bolt $e$, upon which it turns as a center. It will be seen, therefore, that the greater weight of the dog B is thrown forward of the pivot, and that the normal position of the dog B is that illustrated in Fig. 1. On the upper side of the draw-head I set into the surface a plate, $a$, provided with a slot or opening, $b'$, and sustained in position by two vertical bolts or rods, $b\ b$, one on each side of the draw-head, passing through vertical holes in the draw-head, whereby the plate $a$ is allowed a free vertical movement, for a purpose hereinafter set out. Immediately behind the plate $a$ the draw-head has a slot, $g$, cut in it, in a line with slot $b'$ in plate $a$, and of about the same dimension. These two slots $b'$ and $g$ receive and retain the ends $i$ and $i'$ of the dog B, to secure the coupling-link. Pivoted to the outside of the draw-head, at $d$, is a lever, C, the lower end of which rests beneath one of the rods $b$, and the upper end being provided with a foot-piece, $p$, wherewith to operate the lever.

The operation is as follows: The device being in the condition illustrated in Fig. 1, the link $c$ is passed into the draw-head, when the weighted levers H H hold it in position. When the cars come together, the link is forced into the draw-head until the end strikes the dog B above the pivot $e$, and pushing back the end $i'$ the plate $a$ is raised by said end until the end $i'$ registers with the slot $g$. At the same time the end $i$ of the dog has passed beneath slot $b'$, and the plate $a$ drops and securely holds the ends of the coupling-dog, thereby completing the operation of coupling. To uncouple, the end $p$ of lever C is pushed forward, the lower end raises bolt $b$ and plate $a$, and releases the ends of the dog, so it drops forward and downward and releases the link.

Having thus described my invention, what I desire to secure by Letters Patent is—

1. The draw-head, in combination with the independent weighted link-sustaining levers H F, for the purpose set forth.

2. The curved dog B, pivoted behind the center, in combination with the vertically-sliding plate $a$, provided with vertically-moving rods $b\ b$, substantially as and for the purpose set forth.

3. The car-coupling herein described, having the draw-head A, curved dog B, pivoted behind the center, the sliding plate $a$, provided with slot $b'$ and rods $b\ b$, lever C, having foot-piece $p$, and weighted levers H F, all constructed, arranged, and operated as set forth.

In testimony whereof I hereunto set my hand this the 3d day of January, A. D. 1884.

GARRETT B. GANO.

Witnesses:
E. B. HAY,
J. R. FITZHUGH.